United States Patent [19]

Dyott

[11] Patent Number: 4,557,551

[45] Date of Patent: Dec. 10, 1985

[54] NON-LINEAR OPTICAL FIBER COUPLER AND A METHOD OF MAKING SAME

[75] Inventor: Richard B. Dyott, Orland Park, Ill.

[73] Assignee: Andrew Corporation, Orland Park, Ill.

[21] Appl. No.: 536,621

[22] Filed: Sep. 28, 1983

[51] Int. Cl.⁴ ............................................. G02B 5/14
[52] U.S. Cl. ............................. 350/96.15; 350/96.10; 350/96.29; 350/96.30; 350/96.34; 156/600; 156/608; 65/2; 65/4.1
[58] Field of Search ............... 350/96.10, 96.11, 96.12, 350/96.14, 96.15, 96.16, 96.20, 96.21, 96.29, 96.30, 96.32, 96.34; 65/1, 2, 3.11, 4.1, 4.2, 4.21, 4.3; 156/1, 600, 603, 608, 610, 612, 617 R, 617 M, 617 H

[56] References Cited

U.S. PATENT DOCUMENTS

| 3,096,158 | 7/1963 | Gaule et al. | 156/608 |
| 3,535,017 | 10/1970 | Miller | 350/96.30 |
| 3,619,795 | 11/1971 | Marcatili | 350/96.12 |
| 4,077,699 | 3/1978 | Dyott et al. | 350/96.34 |
| 4,181,515 | 1/1980 | Dyott et al. | 65/3 |
| 4,236,785 | 12/1980 | Papuchon et al. | 350/96.14 |
| 4,355,863 | 10/1982 | Aulich et al. | 350/96.15 |

FOREIGN PATENT DOCUMENTS

| 54-137362 | 10/1979 | Japan | 350/96.15 |
| 1331228 | 10/1973 | United Kingdom | 350/96.14 |

OTHER PUBLICATIONS

Stevenson, "Growth and Characteristics . . . Meta-Nitroanaline," J. of Cryst. Growth, vol. 37, No. 2, 2/77, pp. 116–128.
Schiffner et al, "Double Core Single Mode . . . Directional Coupler," Applied Physics, vol. 23, 1980, pp. 41–45.
Stevenson et al, "Optical-Fibre Waveguide With A Single-Crystal Core" (2 pages)-*Electronic Letters*, Oct. 31, 1974, vol. 10, No. 22.
Babai et al., "Crystal Growth of Organic Materials in Glass Capillaries"—*Journals of Materials Science* 12, (1977), pp. 869–872.

*Primary Examiner*—William L. Sikes
*Assistant Examiner*—Brian M. Healy
*Attorney, Agent, or Firm*—Leydig, Voit & Mayer

[57] ABSTRACT

A non-linear waveguide component is formed by a pair of optical fibers disposed in side-by-side relation and defining between them a space of elliptical cross-section. A single crystal of electro-optic material is grown in situ in the space between the fibers and has major and minor crystal axes coinciding with the major and minor axes of the space.

15 Claims, 9 Drawing Figures

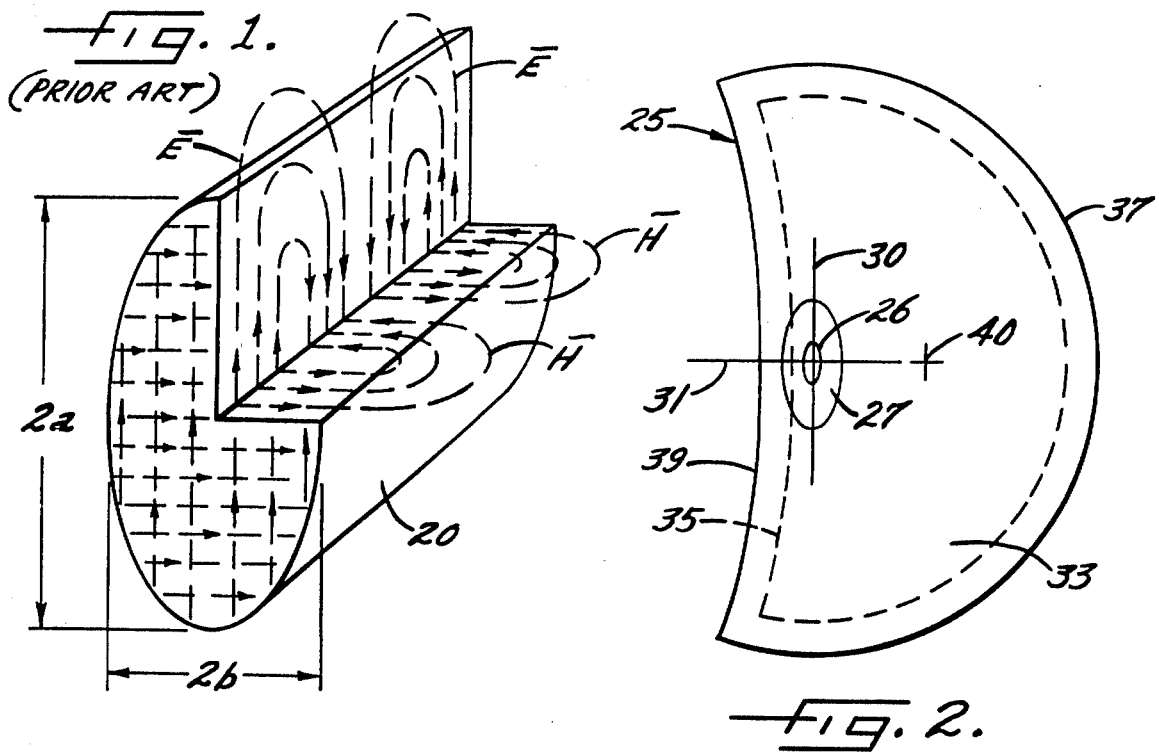
Fig. 1. (PRIOR ART)
Fig. 2.
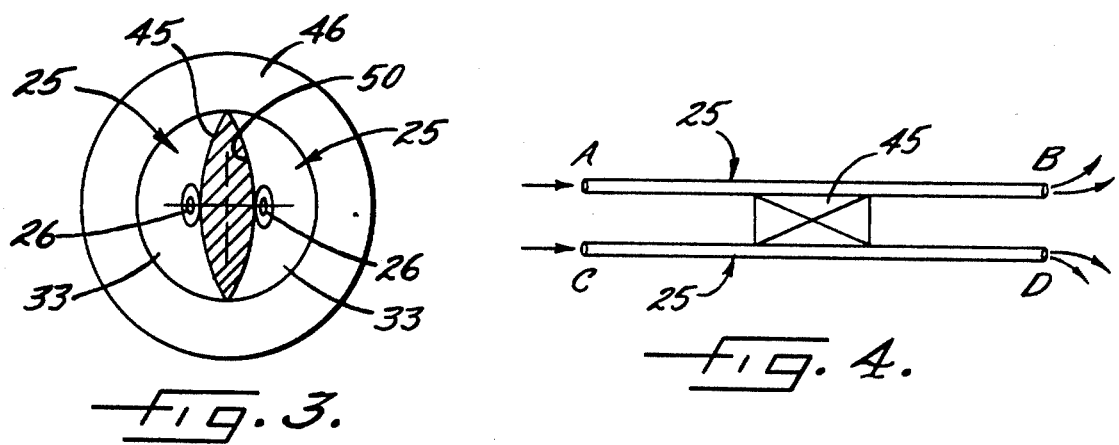
Fig. 3.
Fig. 4.
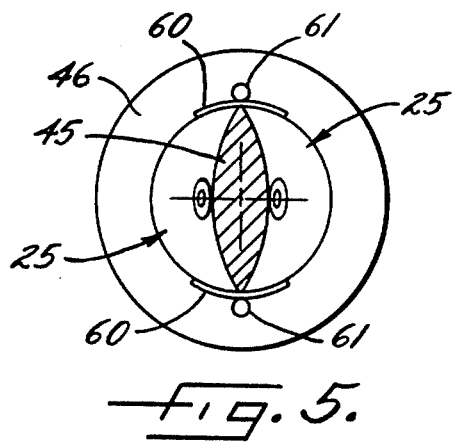
Fig. 5.

NON-LINEAR OPTICAL FIBER COUPLER AND A METHOD OF MAKING SAME

BACKGROUND OF THE INVENTION

This invention relates generally to the field of fiber optics and relates more particularly to non-linear optical waveguide components. Such a component may, for example, be a directional coupler, a mixer, a parametric amplifier or a second harmonic generator.

Dyott et al U.S. Pat. No. 4,181,515 discloses non-linear optical waveguide components which are formed by a single crystal core disposed within the cladding of an optical fiber. The crystal is formed from optically anisotropic material and is arranged such that its refractive indices along first and second transverse orthogonal axes are larger and smaller, respectively, than the refractive index of the cladding.

Dyott U.S. application Ser. No. 404,283, filed Aug. 2, 1982, entitled Self-Aligning Optical Fiber with Accessible Guiding Region and assigned to the assignee of the present invention discloses a self-aligning optical fiber comprising a core and cladding having different refractive indices and forming a single-mode guiding region. The guiding region is located sufficiently close to the surface of the fiber, along a selected length of the fiber, to allow coupling to a guided wave. The outer surface of the fiber has a non-circular cross-section with a predetermined geometric relationship to the guiding region so that the location of the guiding region can be ascertained from the geometry of the outer surface. Preferably, the guiding region of the fiber has an elliptical cross-section defining two transverse orthogonal axes which, in combination with the different refractive indices of the core and cladding, permit the de-coupling of waves polarized along such axes. The non-circular cross-section of the outer surface of the fiber preferably has a predetermined geometric relationship to the transverse axes of the elliptical guiding region so that the orientation of those axes can also be ascertained from the geometry of the outer surface.

SUMMARY OF THE INVENTION

The general aim of the present invention is to provide new and improved non-linear optical waveguide components in which a pair of self-aligning optical fibers of the foregoing type are coupled by a crystal-filled interaction region to form a directional coupler, a mixer, a parametric amplifier, a second harmonic generator or the like.

A more detailed object of the invention is to provide components of the foregoing type in which a single crystal made of electro-optic material is grown in situ between two fibers and, as an incident to being grown, is automatically positioned with its crystal axes aligned with the axes of the guiding regions of the fibers.

Still another object is to shape the fibers in a novel manner so that the fibers coact to define between them a generally elliptical space for growing a crystal having a generally elliptical cross-section and having crystal axes alined with the axes of the elliptical guiding regions of the fibers.

The invention also resides in the unique method for forming the components.

These and other objects and advantages of the invention will become more apparent from the following detailed description when taken in conjunction with the accompanying drawings.

BRIEF DESCRIPTION OF THE DRAWINGS

FIG. 1, labelled Prior Art, is a diagrammatic perspective view, in partial section, illustrating the electric and magnetic fields in their preferred directions of polarization in the elliptical core of a single-mode optical fiber waveguide.

FIG. 2 is a cross-sectional view of a substantially D-shaped optical fiber of the type used with waveguide components of the present invention.

FIG 3. is a cross-sectional view of one embodiment of a new and improved waveguide component incorporating the unique features of the present invention.

FIG. 4 is a schematic plan view of the waveguide component shown in FIG. 3.

FIG. 5 is a view similar to FIG. 3 but shows another embodiment of a waveguide component incorporating the features of the present invention.

Figure 6:
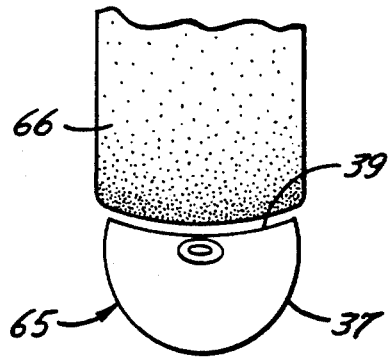
FIGS. 6, 7 and 8 are schematic views showing successive steps of making the waveguide component shown in FIG. 3.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents and alternatives falling within the spirit and scope of the invention as defined by the appended claims.

DETAILED DESCRIPTION OF THE PREFERRED EMBODIMENTS

Turning now to FIG. 1, there is shown a dielectric core 20 for supporting the propagation of electromagnetic fields $\overline{E}$ $\overline{H}$ in the axial direction. This particular core 20 has an elliptical cross-section with a major diameter $2a$ and a minor diameter $2b$. A single-mode optical fiber has such a core 20 with a relatively high dielectric constant/index of refraction which tends to confine and guide electromagnetic energy (i.e., light) along the axis of the core. It is known that if the index of refraction of the core 20 is properly chosen in relation to the index of refraction of the surrounding medium, the core dimensions a, b, and the wavelength of the light, the distribution of the fields $\overline{E}$, $\overline{H}$ will tend to occur in a single, well-defined pattern, or mode. Shown in FIG. 1 is the field pattern for the $_0HE_{11}$ mode.

Single-mode propagation has the advantage of providing well-defined field patterns for coupling the fiber to optical devices. Another advantage is that the attributes of the light propagation, such as group velocity and phase velocity, are relatively constant as the light propagates down the fiber. Single-mode propagation does not, however, guarantee that the polarization of the signal is fixed in any definite or constant angular relationship with respect to the core 20. Polarization is defined as the direction of the electric field vector $\overline{E}$. Thus, as shown in FIG. 1, the light is polarized a vertical direction.

In single-mode fiber-optic sensors, the phase of the optical signal at the end of a sensor fiber is made a function of an environmental parameter sought to be measured and is compared to the phase of a reference signal in a reference fiber. Typically, the phase-shift is introduced by physically the fiber or by changing the index of refraction of the core 20. But if the core 20 is not polarization-preserving, the polarization of the light tends to change randomly as the light propagates down the axis of the core 20. Such a random change in polarization results in a fluctuation of the detected signal since a 180° rotation of the direction of polarization is equivalent, at the end of the fiber, to a 180° phase shift. Thus, for sensor applications, the polarization of the light should be maintained at a fixed angular relationship with respect to the fiber as the light propagates down the core.

To maintain or preserve the polarization of a signal in an optical fiber, the optical properties of the fiber must be anisotropic or, in other words, a function of the angle of polarization with respect to the fiber. One method of making the optical fiber anisotropic is to make the core 20 have a cross-section which is elliptical or some other non-circular shape which defines two transverse orthogonal axes permitting the de-coupling of waves polarized along those axes. Signals which are launched into such fibers in alignment with one of the transverse axes tend to remain aligned with that axis as the signals are propagated through the fiber, thereby preserving the polarization of the signal.

In the present instance, the core of the guiding region in a single-mode optical fiber 25 (FIG. 2) has a non-circular cross-section which defines two transverse orthogonal axes for holding the polarization of signals aligned with those axes. The guiding region is located sufficiently close to the surface of the fiber, along a selected length of the fiber, to allow coupling to a guided wave. Moreover, the outer surface of the fiber has a non-circular cross-section with a predetermined geometric relationship to the guiding region and the orthogonal transverse axes of the core so that the location of the guiding region and the orientation of the transverse axes can be ascertained from the geometry of the outer surface. Thus, as illustrated in FIG. 2, an optical fiber 25 has an elliptical core 26 with a relatively high index of refraction surrounded by an elliptical cladding 27 with a lower index of refraction. The dimensions and the refractive indices of the core 26 and the cladding 27 are selected to provide a single-mode guiding region. Because of its elliptical shape, this guiding region will also hold the polarization of optical signals propagated therethrough in alignment with either axis of the ellipse. That is, the major and minor axes 30 and 31 of the elliptical cross-section represent two transverse orthogonal axes which permit the de-coupling of waves polarized along those axes.

Surrounding the guiding region formed by the core 26 and cladding 27 is a support layer 33 which provides the fiber 25 with increased mechanical strength and ease of manipulation. Since the support layer 33 is not a part of the guiding region, its optical properties are not nearly as critical as those of the core 26 and the cladding 27. To prevent light from being trapped in the cladding 27, the support layer has an index of refraction higher than that of the cladding 27.

As can be seen in FIG. 2, by removing a thin portion of the support layer 33, and also a portion of the cladding 27 if necessary to achieve the desired degree of coupling (e.g., by etching to the dashed contour 35 in FIG. 2), the guiding region formed by the core 26 and cladding 27 can be located sufficiently close to the surface of the fiber to allow coupling to a guided wave. As an alternative, a selected segment of the fiber can be drawn to reduce the fiber diameter within that segment and thereby expand the field of the guiding region to permit the coupling of guided waves to and from the guiding region in that segment of the fiber.

The outer surface of the fiber as defined by the support layer 33 in FIG. 2 has a substantially D-shaped cross-section defined by a convex arcuate surface 37 and a flatter surface 39. The guiding region of the substantially D-shaped fiber 25 of FIG. 2 is located at the center of the arc defined by the arcuate surface 37 but is offset or displaced from the centroid of mass 40 of the D-section toward the flatter surface 39 of the D along the perpendicular bisector of the flatter surface, such bisector coinciding with the minor axis 31 of the elliptical guiding region. Preferably, the guiding region is located within a few average core diameters of the flatter surface 39 so that the outer surface of a portion of the fiber may be etched to expose the guiding region at the surface 39, thereby permitting the transmission of gradual exchange of light between the guiding region and the fiber surface. For example, the guiding region can be located within about three average core diameters of the flatter surface 39. For the elliptical core 20, the average core diameter is the sum (a+b) of the major and minor radii.

In accordance with the present invention, optical fibers 25 of the foregoing type are uniquely shaped and are paired together with a single crystal 45 (FIG. 3) of electro-optic material to form non-linear optical waveguide components such as directional couplers, mixers, parametric amplifiers or second harmonic generators. As a result of the novel shape of the fibers and the manner in which the fibers are paired, the axes of the crystal become automatically aligned with the axes of the elliptical guiding regions of the fibers when the crystal is formed. This enables proper coupling between the two fibers across the crystal.

More specifically, fibers 25 constructed in accordance with the invention, while being generally D-shaped, do not have a truly straight surface 39. Instead, the flatter surface 39 of the fiber is formed with a concave shape as shown in FIG. 2, the radius of curvature of the concave surface 39 being signficantly greater than the radius of curvature of the convex surface 37. The minor axis 31 of the elliptical guiding region of the fiber extends perpendicular to the concave surface 39 at the midpoint thereof.

Figure 8:
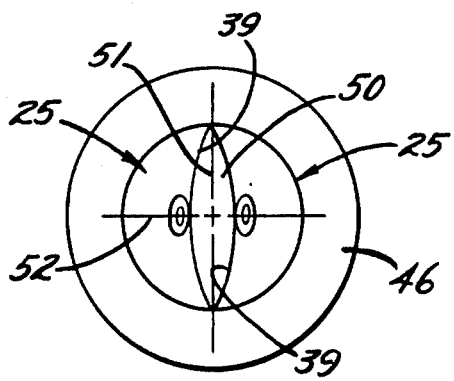

In carrying out the invention, two of the fibers 25 are located such that their concave surfaces 39 are disposed in facing relation (see FIG. 3), the fibers preferably being located within an outer tube 46 made of glass or the like. When the fibers are so positioned, a generally elliptical space 50 (FIG. 8) is defined between the concave surfaces 39 of the two fibers. As shown in FIG. 8, the major axis 51 of the elliptical space 50 extends parallel to the major axes 30 of the guiding regions of the fibers while the minor axis 52 of the elliptical space is aligned with the minor axes of the guiding regions. The minor axis 52 of the elliptical space 50 extends between and generally perpendicular to the midpoints of the concave surfaces 39 of the fibers.

Further in carrying out the invention, a single crystal 45 (FIG. 3) of electro-optic material fills the elliptical space 50 between the two fibers 25. As will be explained subsequently, the crystal is grown in situ between the fibers and, as an incident thereto, the crystal is formed such that its transverse orthogonal crystal axes coincide automatically with the axes 51 and 52 of the space 50. As a result, a parallel relationship is established between the major axis of the crystal and the major axes 30 of the guiding regions of the fibers 25 while an aligned relationship is established between the minor axis of the crystal and the minor axes 31 of the guiding regions. This enables the guiding regions of the two fibers to be properly coupled to one another across the crystal.

The crystal is made from a material such as metanitroaniline, meta-dinitrobenzene or 1-methyl, 4-nitroaniline. It should be appreciated, however, that other materials having a non-centro-symmetric crystal structure may be used. Several of such materials are described in United Kingdom Patent 1,331,228.

FIG. 4 is a schematic illustration of a non-linear waveguide component formed by the fibers 25 and the crystal 45. When the component is a four-wave mixer or parametric amplifier, for example, a signal at wavelength $f_1$ is launched into one of the fibers 25 at A while a pump wave at a wavelength $f_2$ greater than $f_1$ is launched into the other fiber at C. The electric field of the pump wave changes the index of the crystal so as to produce parametric amplification of the signal at wavelength $f_1$ at D. When the component is used as a second harmonic generator, a signal at wavelength $f_1$ launched into one of the fibers 25 at A interacts with a signal launched into the other fiber at C and causes the refractive index of the crystal to change non-linearly so as to generate second harmonics and produce a signal at wavelength $2f_1$ at D. By applying and removing an external electric field to the component, the latter may be used as a switching coupler to effect either zero energy transfer (full "off") or complete energy transfer (full "on") from, for example, A to D. By varying the external electric field, the energy transfer may be modulated between full "off" and full "on" so that the component functions as a modulator. The external electric field may be applied across the crystal by means of flat electrodes 60 (FIG. 5) located at the interface of the tube 46 and the fibers 25 and connected to electrical conductors 61, there being one electrode at each apex of the crystal.

The fibers 25 may be made in generally the same manner as disclosed in the aforementioned Dyott application and preferably are drawn from a preform 65 of the type shown in FIG. 6. In one particular example, a preform may be made by depositing a pure silica cladding and a germania core on the inside surface of a silica tube after diametrically opposed portions of the outside surface of the tube first are ground flat. The cladding and core may be formed by the thermal decomposition of silicon tetrachloride and germanium tetrachloride circulated through the bore of the silica tube at approximately 1800° C. in an induction furnace. The tube then may be collapsed radially to form a preform 65 having an outer surface with a cylindrical cross-section and having a central core and cladding of elliptical cross-section. One side of the elliptical-cored preform then may be ground into a concave shape by a profiled grinding wheel 66 as shown in FIG. 6. The preform thus has a generally D-shaped cross-section with a convex arcuate surface 37 and with a concave surface 39. Optical fiber then may be drawn from the D-shaped preform at a temperature of about 1790° C. while feeding the preform at a rate of about 0.3 mm/sec. and while pulling fiber from the preform at a rate of about 0.5 m/sec.

Figure 7:
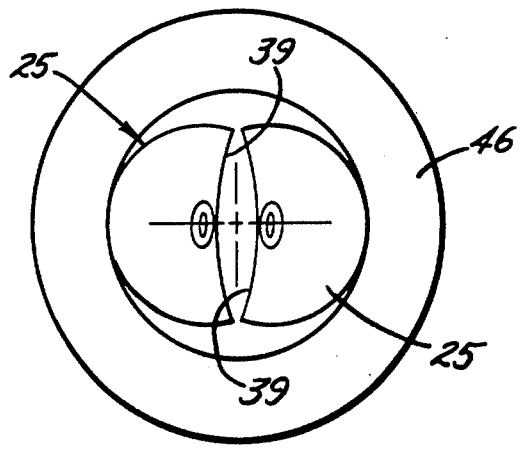

After being drawn, two of the fibers 25 are placed in a cylindrical glass tube 46 with the concave sides of the fibers disposed in face-to-face relation as shown in FIG. 7. The tube then may be heated to its softening point and then drawn by a suitable pulling machine which may be of the type disclosed in the aforementioned Dyott application. As the tube is drawn, its diameter decreases so that the tube closes in on the fibers and squeezes the fibers together as shown in FIG. 8. The drawing is continued until the two fibers engage one another at the ends of the concave surfaces 39. Upon completion of the drawing operation, the convex arcuate surfaces 37 of the fibers interface with the inside of the tube 46 while the concave surfaces 39 of the fibers define the boundaries of a generally elliptical space 50 located between the fibers.

Figure 9:
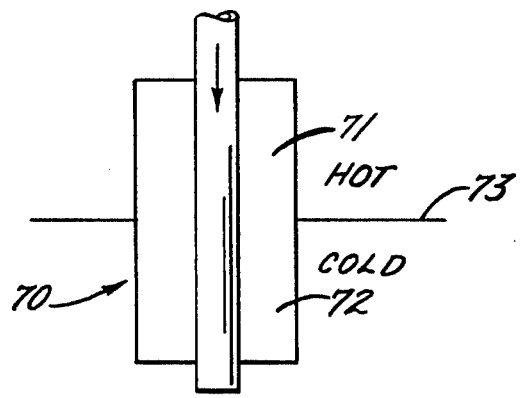
FIG. 9 is a schematic view of apparatus for growing the crystal of the waveguide component.

A single crystal 45 then is grown in situ in the space 50 between the fibers 25. The crystal may be grown generally in accordance with the techniques disclosed in Dyott et al U.S. Pat. No. 4,181,515. Preferably, however, use is made of a heat exchanger 70 of the type shown schematically in FIG. 9 and having hot and cold zones 71 and 72 separated by a very large thermal gradient 73. Molten material such as molten meta-nitroaniline may be placed in the space 50 between the fibers 25 and then the tube 46 may be placed in the heat exchanger and lowered very slowly from the hot zone to the cold zone. As the tube moves downwardly, the meta-nitroaniline will slowly super cool to a point at which further super cooling is impossible whereupon nucleation of the meta-nitroaniline will occur. Because the crystal 45 is grown in and is confined by the elliptical space 50, the three orthogonal axes of the crystal automatically align with the corresponding axes of the fibers 25 as the crystal is grown.

I claim:

1. A non-linear waveguide component comprising a pair of optical fibers having orthogonal polarization-holding axes, said fibers being disposed in side-by-side relation and defining between them a space of generally elliptically cross-section, the major and minor cross-sectional axes of said elliptical space having a predetermined geometric relationship to said polarization-holding axes of said fibers, and a single crystal of solid organic electro-optical material filling said space and having major and minor cross-sectional crystal axes coinciding with the major and minor cross-sectional axes, respectively, of said space.

2. A non-linear waveguide component as defined in claim 1 in which each of said fibers includes a core of generally elliptical cross-section, each of said cores having a minor axis which is aligned with the minor axis of said space and having a major axis which extends generally parallel to the major axis of said space.

3. A non-linear waveguide component as defined in claim 2 in which each of said fibers is generally D-shaped cross-section, each of said fibers having a concave peripheral surface defining the flatter side of the D, said fibers being positioned with said concave surfaces disposed in facing relation, said space being located between said concave surfaces with the minor axis of said space extending between and generally perpendicular to the midpoints of said concave surface.

4. A non-linear waveguide component as defined in claim 3 in which the remaining peripheral surface of each fiber is shaped as a convex arc, the core of each fiber being positioned with its center coinciding with the center of the arc.

5. A non-linear waveguide component as defined in claim 2 further including a cladding surrounding the core of each fiber and having a lower index of refraction than the core, and a silica jacket surrounding at least a portion of the cladding of each fiber.

6. A non-linear waveguide component as defined in claim 5 in which said fibers are captivated within a tube.

7. A non-linear waveguide component as defined in claim 1 in which said crystal is made of electro-optic material.

8. A non-linear waveguide component as defined in claim 7 in which said crystal is a material selected from a group of materials consisting essentially of meta-nitroaniline, meta-dinitrobenzene and 1-methyl, 4-nitroaniline.

9. A non-linear waveguide component as defined in claim 1 in which said component is a directional coupler.

10. A non-linear waveguide component as defined in claim 1 in which said component is a parametric amplifier.

11. A non-linear waveguide component as defined in claim 1 in which said component is a second harmonic generator.

12. A non-linear waveguide component comprising a pair of optical fibers each having a generally D-shaped cross-section, each of said fibers having a concave surface defining the flatter side of the D, said fibers being positioned with said concave surfaces disposed in facing relation and defining between them a space of generally elliptical cross-section, the major and minor cross-sectional axes of said elliptical space having a predetermined geometric relationship to said flatter sides of the D-shaped cross sections of said fibers, said space having a minor axis extending between and generally perpendicular to the midpoints of said concave surfaces and having a major axis extending generally perpendicular to said minor axis, each of said fibers having a core of generally elliptical cross-section and located adjacent the concave surface of the fiber, each of said cores having a minor axis which is aligned with the minor axis of said space and having a major axis which extends generally parallel to the major axis of said space, and a single crystal of solid organic electro-optic material filling said space with the crystal axes of said crystal coinciding with the axes of said space.

13. A non-linear waveguide component as defined in claim 12 further including a cladding surrounding the core of each fiber and having a lower index of refraction than the core, a silica jacket surrounding at least a portion of the cladding of each fiber, and a tube captivating the fibers in fixed relation to one another.

14. A non-linear waveguide component as defined in claim 13 in which said crystal is a material selected from a group of materials consisting essentially of meta-nitroaniline, meta-dinitrobenzene and 1-methyl, 4-nitroaniline.

15. A method of making a non-linear waveguide component, said method comprising the steps of, providing a pair of optical fibers each having a generally elliptical core defining orthogonal polarization-holding axes, shaping one surface of each fiber so as to form such surface into a concave configuration, placing the fibers into an outer tube with the concave surfaces of the fibers disposed in spaced face-to-face relation and with the major axes of the cores of the two fibers extending parallel to one another, radially collapsing the tube to bring the fibers together while leaving a space of generally elliptical cross-section between the concave surfaces of the fibers, the major and minor cross-sectional axes of said elliptical space having a predetermined geometric relationship to said polarization-holding axes of said fibers, and growing a crystal of solid organic anisotropic electro-optic material in said space.

* * * * *